(12) United States Patent
Kuran

(10) Patent No.: US 7,146,906 B2
(45) Date of Patent: Dec. 12, 2006

(54) BRAZIER GRILL AND A BRAZIER

(76) Inventor: Hikmet Kuran, Sunnanby Plan 6, Spanga (SE) 16371

( * ) Notice: Subject to any disclaimer, the term of this patent is extended or adjusted under 35 U.S.C. 154(b) by 147 days.

(21) Appl. No.: 10/721,987

(22) Filed: Nov. 25, 2003

(65) Prior Publication Data

US 2004/0139862 A1    Jul. 22, 2004

(30) Foreign Application Priority Data

Jan. 21, 2003    (SE) ................................ 0300133

(51) Int. Cl.
*A47J 37/07* (2006.01)
*A47J 27/00* (2006.01)

(52) U.S. Cl. .............. 99/445; 99/400; 99/446
(58) Field of Classification Search ............... 99/445, 99/400, 401, 444, 446; 126/25 R
See application file for complete search history.

(56) References Cited

U.S. PATENT DOCUMENTS

| | | | |
|---|---|---|---|
| 3,369,481 A * | 2/1968 | Pappas | 99/445 |
| 4,658,710 A * | 4/1987 | Quet et al. | 99/445 |
| 5,036,180 A | 7/1991 | Scott | |
| 5,237,914 A | 8/1993 | Carstensen | |
| 5,347,978 A | 9/1994 | Zuran | |
| 5,355,780 A * | 10/1994 | Campbell | 99/450 |
| 5,363,752 A | 11/1994 | Weil | |
| 5,437,221 A | 8/1995 | Schwod | |
| 2002/0014163 A1 | 2/2002 | Clark | |

FOREIGN PATENT DOCUMENTS

| | | | |
|---|---|---|---|
| DE | 3422314 A1 | 12/1985 | |
| DE | 4206453 A1 | 9/1993 | |
| DE | 19724035 A1 | 12/1998 | |
| DE | 19852579 A1 | 5/2000 | |
| EP | 0099551 | * 2/1984 | 99/445 |
| EP | 0099551 A2 | 2/1984 | |
| FR | 2789286 A3 | 8/2000 | |

* cited by examiner

*Primary Examiner*—Reginald L. Alexander
(74) *Attorney, Agent, or Firm*—Akerman Senterfitt

(57) ABSTRACT

The present invention relates to a brazier grill and a brazier with such grill used for cooking foodstuffs. Said brazier grill (2) is single layered and comprises grooved grill bars (4, 4', 4"), which are placed in parallel to each other and remove molten fats and cooking liquids emanating from foodstuffs placed thereon during grilling. Two such grooved grill bars (4, 4', 4") are placed side by side in parallel with a b2 distance to form a grill grill opening (6) corresponding to 1 mm to 10 mm. This grill opening (6) is formed in a direction perpendicular (T) to the grill so as to allow heat rays emitted from an underneath heat source to pass directly (without encountering any obstructions) through such grill openings to reach a foodstuff on said grooved grill bars during grilling.

1 Claim, 3 Drawing Sheets

BRAZIER GRILL AND A BRAZIER

TECHNICAL FIELD

The present invention relates to a brazier grill (i.e. cooking grill) and a brazier where such grill is employed.

BACKGROUND OF INVENTION

Everyone having grilled meat-like food by a brazier can estimate that a brazier flares up and emanates smoke when molten fats and other cooking liquids from grilled meat fall below on glowing charcoal, volcano stone etc. This circumstance of flare-ups and smokes are not only unpleasant; it also bears a high risk of burning and scorching such foodstuff.

Concerning this problem encountered in braziers, some patented inventions have been developed so far. Patents U.S. Pat. No. 5,237,914 and U.S. Pat. No. 5,437,221 can be quoted as relevant examples. Braziers employed in these inventions comprise two structural layers or components. The upper grill functions to accommodate foodstuffs. The lower grill is positioned underneath the upper grill so as to entirely cover its grill openings and comprises grooved bars to collect and remove such dripping molten fats, etc. Such grills, however, have huge disadvantages. Since foodstuffs are not exposed directly to heat rays emitted from an underneath heat source, they provide only the taste of meat cooked/heated on a piece of iron sheet, and not the taste and quality of grilled meat. Also collected grease, fats, etc. burn in lower grooved bars and emanate smoke and flame, and leave residues.

DESCRIPTION OF INVENTION

One objective of the present invention is to provide a novel grill and brazier, at least to partially overcome the foregoing disadvantages resulting from technical arrangements. Another objective of the present invention is to provide a novel grill and brazier to obtain the desired grill quality and taste in foodstuffs by avoiding flare-ups and substantially removing molten fats.

These objectives are obtained with a brazier grill used on a brazier or a similar means to grill foodstuffs. This grill is single layered and comprises mainly grooved grill bars, which are placed side by side in parallel and which aim at removing molten fats and cooking liquids of foodstuffs grilled thereon. Two such grooved grill bars are positioned side by side with a certain distance corresponding to 1 mm to 10 mm and thus create a grill grill opening perpendicular to the grill so as to allow beat rays emitting from an underneath heat source to pass through this grill opening to directly contact the foodstuff on the grill without encountering any obstructs.

One advantage of the solution brought with the present invention is that the substantial amount of molten fats and cooking liquids released from a grilled foodstuff is collected in the grooves of grill bars, and a negligible amount of such material passes below from the relatively narrow grill openings, and further in that a real grill quality and taste is obtained, as foodstuffs on grill bars are directly exposed to heat rays emitted from an underneath heat source.

Another advantage is that the present invention eliminates the need towards a second grill assembly (in respect of the prior art), which comprises grooved grill bars and is positioned under the upper grill to collect molten fats and cooking liquids dripping from the upper grill.

Such liquids can still be collected in spite of the lack of a lower grill assembly and the desired grill taste can be achieved at the same time.

A further advantage of the present invention is that such molten fats and cooking liquids can be collected and removed before they are burned and stick to grill bars, since foodstuffs lowers the temperature in such grill bars.

Performed tests have surprisingly revealed that the grill grill openings between parallel grill bars constitute a critical parameter in obtaining the desired grill quality. This quality cannot be obtained, if the grill grill openings between the grill bars are very narrow, or if a foodstuff on the grill does not directly contact with heat rays through such grill openings. If such grill openings are wider than necessary, a relatively large amount of liquids emanating from grilled foodstuff fall through these grill openings down on heat source to lead to substantial flare-ups, scorches on foodstuff, and dense smokes. The preferred grill grill opening interval corresponds to 3 mm to 9 mm and more preferably to an interval of 4 mm to 8 mm. This latter interval has proved itself optimal in respect to grill taste, grill quality, and to avoiding molten fat drips though such grill grill openings.

The width of a grooved grill bar is determined as another critical parameter. This width is not desired to be larger than 30 mm. If it is larger, the foodstuff becomes like cooked on iron sheet, instead of being grilled. The lower limit of such grill bar is approximately 5 mm, and if it is narrower than this limit, it becomes difficult to accommodate said liquids in grooves and to drain them out. The preferred width interval of a grill bar is 10 mm to 25 mm and more preferably 15 mm to 20 mm. This latter interval has proved itself optimal in respect to grill taste, grill quality, and to collecting molten fats and cooking liquids in such grooves.

The present invention also aims/covers a brazier with a grill to grill foodstuff. Thanks to a supporting structure to constitute a certain distance and a free space between the grill and heat source, essentially the entire lower surface of the grill, namely the lower surface of parallel grill bars, and foodstuffs on said grill bars directly contact with heat rays emitted from an underneath heat source during grilling.

Other advantages and characteristics in accordance with some embodiments of the present invention are disclosed in the description of an exemplary embodiment given hereunder.

DESCRIPTION OF FIGURES

The detailed description with references made to annexed exemplary figures of the present invention must not to be construed as limiting the present invention.

DETAILED DESCRIPTION OF AN APPLICATION EXAMPLE OF THE PRESENT INVENTION

Figures 1, 2A, 2B:
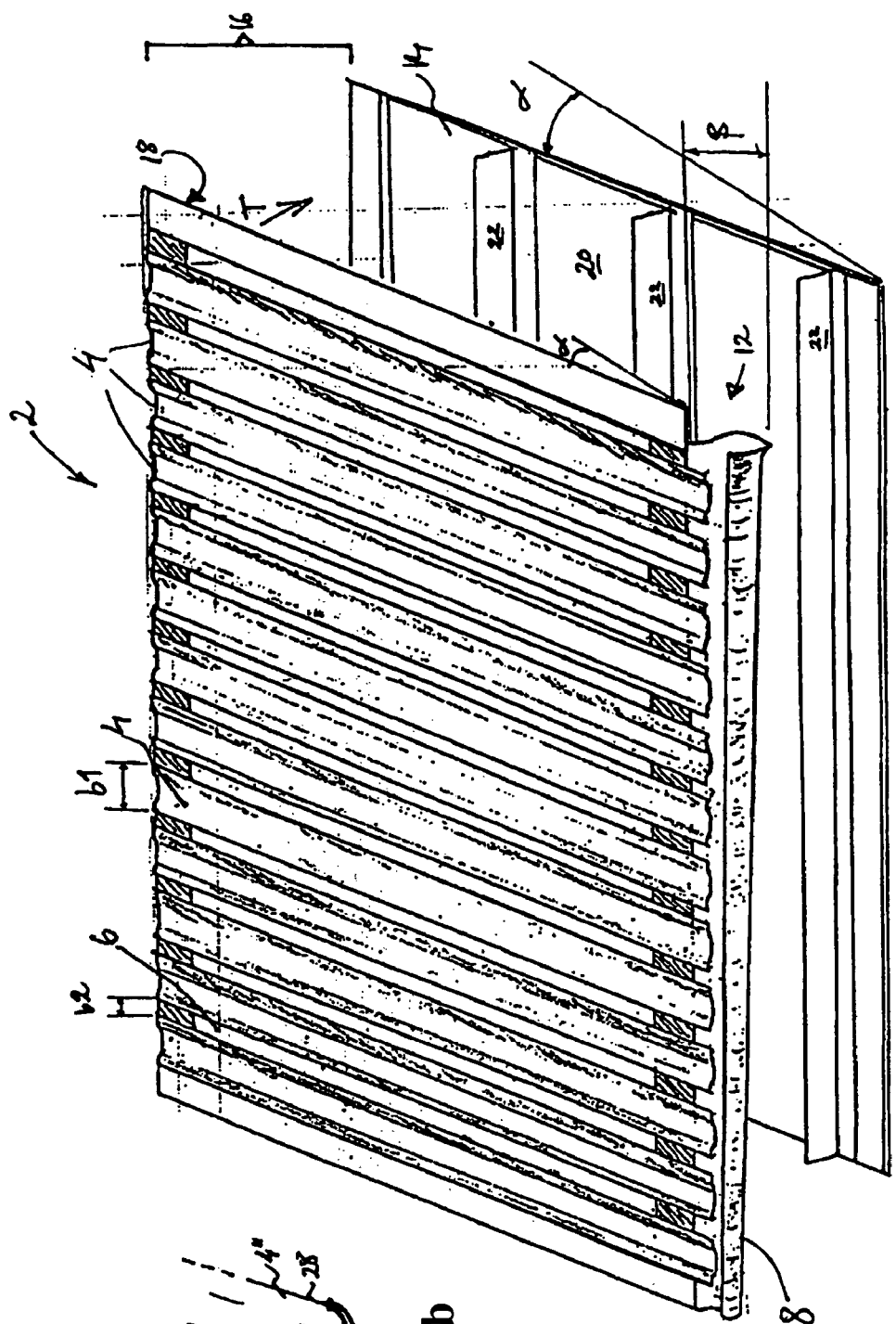
FIG. 1 gives a perspective view of the present invention with a base layer accommodating a heat source such as charcoal, volcano stone, etc.
FIG. 2a gives an enlarged cross-sectional view of a grooved grill bar to show its form with sloped margins.
FIG. 2b gives an enlarged cross-sectional view of an alternative form of a grooved grill bar.
Figure 3:
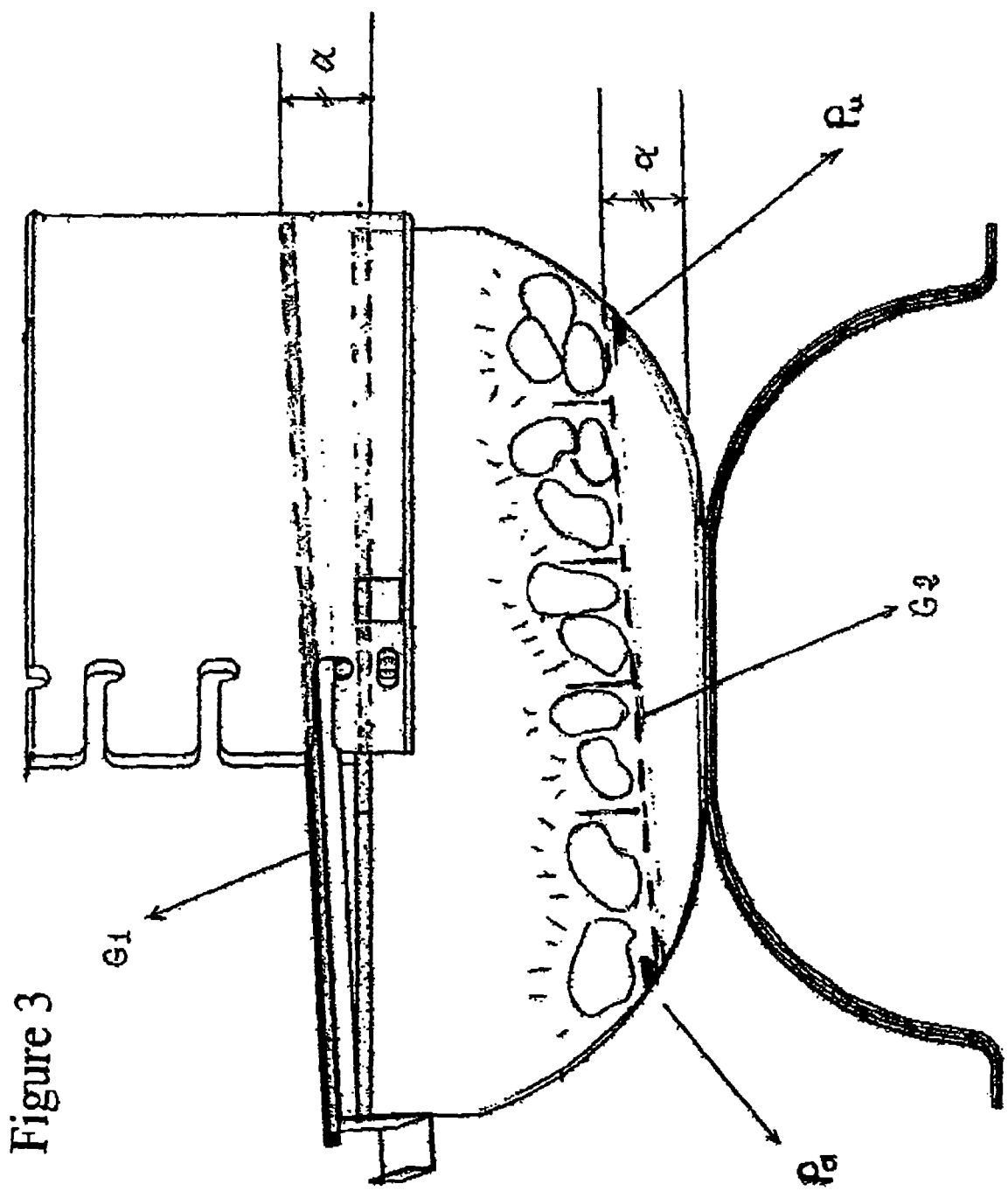
FIG. 3 gives a side sectional view of brazier grill showing a supporting structure constituting a free space between the brazier grill and heat source.
Figure 4:
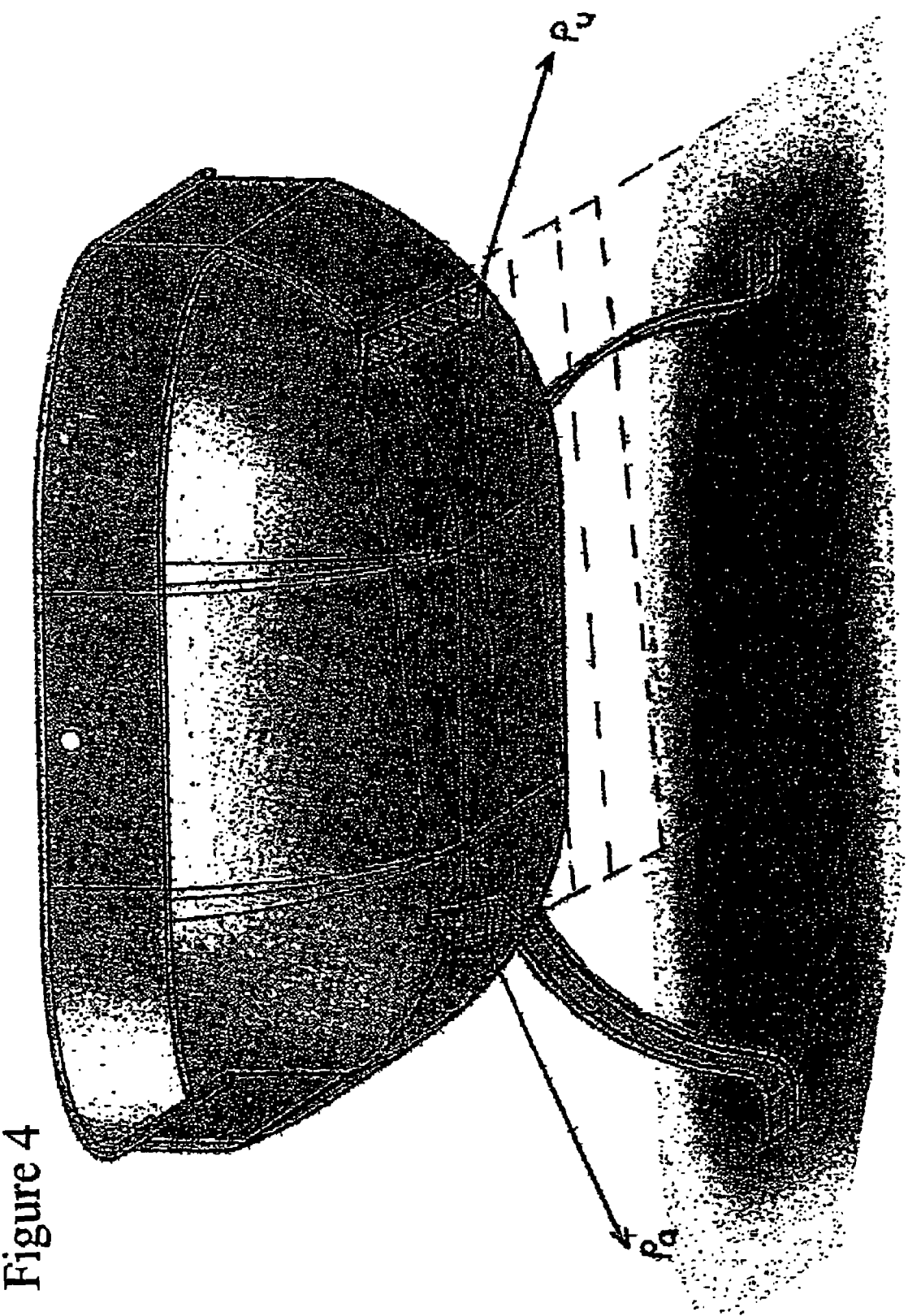
FIG. 4 gives a perspective view of said supporting structure.

FIG. 1 gives the brazier grill (2) according to one application form of the present invention. The grill (2) is single layered and consists essentially of parallel placed grooved grill bars (4). The proper width (b1) of such grooved grill bar corresponds to an interval of 5 mm to 30 mm.

Two of such grooved grill bars (4) are positioned side by side in parallel with a distance (b2) to form a grill grill opening (6) with a width of 1 mm to 10 mm.

This grill opening is formed perpendicularly (with a T-direction) in respect of the grill assembly in order to allow heat rays from an underneath heat source to flow directly (without encountering any obstructs) to the foodstuff (not shown in figure) on grill bars during grilling. What is meant by the term "without encountering any obstructs," is that heat rays emitting from a heat source placed with a certain distance underneath the grill (2) are not obstructed by any other components, drip pans, etc. to be placed between said grill openings (6) and grooved grill bars (4) and such heat source. The grill bars (4) are given a forward inclination ($\alpha$) by 5° to 10° so as to keep free/empty the space between the grill bars and heat source.

A trough (8) is embodied parallel to the grill's front (10) and perpendicular to said grill bars in order to collect and remove molten fats and cooking liquids coming from said grill bars. The grill is placed to a brazier so that the parallel grill bars (4) of the grill forms a projection outward from the grill's front. Normally an inclination ($\beta$) of 10° to 15° is given to the trough (8) embodied perpendicularly to grill bars in order to allow molten fats and cooking liquids to flow and get collected with a can (not shown in figure) by this inclined end (12).

FIG. 1 shows further a base layer (14), which is normally employed when the grill assembly (2) is used in a brazier according to the present invention. A supportive assembly (not shown in Figure) is embodied for the grill (2) in order to form a free space with a certain distance (16) between the grill and heat source. Thus the entire lower surface (18) of grill, namely the lower surface of parallel grill bars (4), foodstuffs placed on such grill, said grill openings (6) between such bars (4), and said free space are directly exposed to the rays emitted by a heat source during grilling.

The base layer (14) has perpendicular projections (22) on it, extending from the base surface (20). These ensure an ash bed consisting of live charcoals, volcano stones etc. to spread uniformly on brazier base and lie entirely parallel to the grill in order to provide a homogeneous heat effect in all places of the grill (2). Particularly when this base layer (14) is given an inclination (a), which is identical with the grill's inclination, it becomes possible to use a charcoal-volcano stones' bed properly, since it will lie parallel to the grill (2). Projections (22) perpendicular to the inclination (a) of the base layer prevent the ash bed from sliding and accumulating on the layer (14). Grill openings can be formed on the base surface (20) to provide airflow for charcoals, volcano stones, etc.

It is not an obligation to embody such brazier grill in a rectangular form, as shown in FIG. 1, it can also be realized in circular or square forms.

FIG. 2a gives a U-shaped cross-section of a part of grooved grill bars (4') according to an alternative application of the grill under FIG. 1. A grooved grill bar (4') in such grill assembly is aimed to bear foodstuff by two of its upward-projecting sloped margins (24), namely two support points. Collected molten fat and cooking liquid are removed from a depressed base (26) between said margins (24) of such grooved grill bar (4').

FIG. 2b gives a wavelike cross-section of said grooved grill bar (4') in another alternative embodiment of the present invention. A grooved grill bar (4") in such grill assembly is aimed to bear foodstuff by crested margins of the wavelike margins (28), namely with three support points. Collected molten fat and cooking liquid are removed two depressed basses (30) between said crested margins (28) of the grill bar.

EXAMPLE

Salmon with 1.5 kg slices is grilled in two separate tests performed with a brazier and brazier grill according to the present invention shown in FIG. 1. The grill grill opening (6) was determined to be 4 mm and 6 mm in first and second tests, respectively. Both tests employed wood coal as a heat source. The total grill period were 14 minutes for each test (7 minutes per surface) and the amount of fat collected in the cap was measured as 0.4 dl. The width of grill bars (4) was kept at 20 mm and the distance between the grill (2) and heat source was maintained at 55 mm during grilling. No flare-ups or smokes were detected visually and the grilled fish proved a good grill quality and taste.

The invention claimed is:

1. A brazier grill for grilling meat or similar foodstuff in a brazier, having grooved grill bars which are essentially placed in parallel to each other and single layered and which allow molten fats and cooking liquids emanating from a foodstuff grilled thereon to drain out during grilling, wherein said grooved grill bars are placed in parallel to each other with a predetermined distance therebetween so as to form a grill opening having a width of 1 mm to 10 mm, in order to allow heat emitted from such heat source to contact said foodstuff directly on such grooved grill bars without encountering any obstructions during grilling, and wherein said grooved grill bars have a wavelike form and comprise three support points for foodstuffs.

* * * * *